(12) United States Patent
Ichinose et al.

(10) Patent No.: US 9,290,180 B2
(45) Date of Patent: Mar. 22, 2016

(54) MINING VEHICLE

(71) Applicant: HITACHI CONSTRUCTION MACHINERY CO., LTD., Tokyo (JP)

(72) Inventors: Masanori Ichinose, Tokyo (JP); Tomohiko Yasuda, Tsuchiura (JP); Takayuki Sato, Tsuchiura (JP); Wataru Tanaka, Tokyo (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 57 days.

(21) Appl. No.: 14/379,519

(22) PCT Filed: Feb. 19, 2013

(86) PCT No.: PCT/JP2013/053978
§ 371 (c)(1),
(2) Date: Aug. 19, 2014

(87) PCT Pub. No.: WO2013/133004
PCT Pub. Date: Sep. 12, 2013

(65) Prior Publication Data
US 2015/0032324 A1 Jan. 29, 2015

(30) Foreign Application Priority Data
Mar. 8, 2012 (JP) .................... 2012-052356

(51) Int. Cl.
*G05D 1/00* (2006.01)
*B60W 30/14* (2006.01)
*G05D 1/02* (2006.01)

(52) U.S. Cl.
CPC ............. *B60W 30/143* (2013.01); *G05D 1/021* (2013.01); *G05D 1/024* (2013.01); *G05D 1/0257* (2013.01);
(Continued)

(58) Field of Classification Search
CPC ............... B60W 2520/14; B60W 2540/18; B60W 2550/10; B60W 2550/306; B60W 2550/146; B60W 30/12; B60W 2720/10; B60W 30/143; B60W 30/16; B60W 40/072; B60Y 2200/142; G01S 13/931; G01S 2013/9353
USPC ............. 701/23, 25, 36, 41, 93, 96, 200, 301, 701/400; 180/170
See application file for complete search history.

(56) References Cited

U.S. PATENT DOCUMENTS

| | | | | |
|---|---|---|---|---|
| 4,670,845 A | * | 6/1987 | Etoh ................. | B60K 31/0008 180/169 |
| 5,648,905 A | * | 7/1997 | Izumi ..................... | G08G 1/22 180/169 |

(Continued)

FOREIGN PATENT DOCUMENTS

| | | |
|---|---|---|
| JP | 6-149374 A | 5/1994 |
| JP | 10239436 A * | 9/1998 |

(Continued)

*Primary Examiner* — Khoi Tran
*Assistant Examiner* — Jorge Peche
(74) *Attorney, Agent, or Firm* — Baker Botts L.L.P.

(57) ABSTRACT

A mining vehicle is provided, which is capable of appropriately recognizing a condition of a traveling road in front of the vehicle, preventing an obstacle on a roadside from being erroneously detected by a distance detector, and controlling the speed of the vehicle in a stable manner even when the vehicle is approaching a curved portion of the road from a linear portion of the road.

The mining vehicle that travels on a transport road of a mining site includes: a minimum roadside distance determining unit; a traveling status calculator configured to calculate traveling status of the vehicle and a turning radius of the vehicle; a roadside distance calculator configured to calculate a roadside distance between the vehicle and a roadside of the transport road; a roadside distance selector configured to select and output a minimum roadside distance if the vehicle is in a rectilinearly traveling state and select and output the roadside distance calculated with the roadside distance calculator if the vehicle is in a turning state; a detected distance limiter configured to disable a signal representing the distance, detected with the distance detector, between the vehicle and the object and the relative speed if the distance between the vehicle and the object is larger than a distance represented by a signal selected and output from the roadside distance selector; and a vehicle speed controller configured to control the speed of the vehicle on the basis of a signal output from the detected distance limiter.

6 Claims, 8 Drawing Sheets

(52) U.S. Cl.
CPC ...... *B60W 2550/146* (2013.01); *B60W 2720/10* (2013.01); *B60Y 2200/142* (2013.01); *G05D 2201/021* (2013.01)

(56) References Cited

U.S. PATENT DOCUMENTS

| | | | | |
|---|---|---|---|---|
| 5,670,963 | A * | 9/1997 | Kubota | G01S 7/4026 342/70 |
| 5,710,565 | A * | 1/1998 | Shirai | B60K 31/0008 340/903 |
| 5,754,099 | A * | 5/1998 | Nishimura | B60T 7/22 340/435 |
| 5,854,987 | A * | 12/1998 | Sekine | B62D 1/28 180/443 |
| 5,955,967 | A * | 9/1999 | Yamada | G01S 13/426 180/169 |
| 6,265,991 | B1 * | 7/2001 | Nishiwaki | G01S 7/295 340/435 |
| 8,694,224 | B2 * | 4/2014 | Chundrlik, Jr. | B60W 50/0098 180/233 |
| 2001/0020201 | A1 * | 9/2001 | Shirai | B60K 31/0066 701/1 |
| 2001/0025211 | A1 * | 9/2001 | Shirai | B60R 16/0231 701/1 |
| 2001/0037165 | A1 * | 11/2001 | Shirai | B60W 30/16 701/1 |
| 2003/0048216 | A1 * | 3/2003 | Kishida | G01S 7/4008 342/70 |
| 2003/0109980 | A1 * | 6/2003 | Kojima | B60K 31/0058 701/96 |
| 2003/0174054 | A1 * | 9/2003 | Shimomura | G01S 7/415 340/435 |
| 2004/0143416 | A1 * | 7/2004 | Hattori | B60K 31/0066 702/157 |
| 2004/0227662 | A1 * | 11/2004 | Sawamoto | G01S 13/584 342/70 |
| 2005/0010351 | A1 * | 1/2005 | Wagner | B60K 31/0008 701/96 |
| 2005/0228580 | A1 * | 10/2005 | Winner | G01S 13/931 701/532 |
| 2006/0239509 | A1 * | 10/2006 | Saito | G06K 9/6205 382/104 |
| 2007/0191997 | A1 * | 8/2007 | Isaji | B60T 7/22 701/1 |
| 2008/0243389 | A1 * | 10/2008 | Inoue | G08G 1/165 701/301 |
| 2008/0300766 | A1 * | 12/2008 | Kumabe | B60K 31/0075 701/98 |
| 2009/0102698 | A1 * | 4/2009 | Ichiyanagi | G01S 13/348 342/70 |
| 2009/0192710 | A1 * | 7/2009 | Eidehall | B62D 15/0265 701/301 |
| 2009/0212930 | A1 * | 8/2009 | Pfeiffer | B60Q 9/008 340/435 |
| 2010/0042282 | A1 * | 2/2010 | Taguchi | G08G 1/161 701/25 |
| 2010/0049375 | A1 * | 2/2010 | Tanimoto | B60T 7/12 701/1 |
| 2010/0076621 | A1 * | 3/2010 | Kubotani | G08G 1/166 701/1 |
| 2011/0222732 | A1 * | 9/2011 | Higuchi | B60W 30/14 382/104 |
| 2011/0261168 | A1 * | 10/2011 | Shima | B60T 7/22 348/47 |
| 2012/0226411 | A1 * | 9/2012 | Kuoch | B60Q 1/085 701/36 |
| 2012/0271483 | A1 * | 10/2012 | Samukawa | B60W 50/14 701/1 |
| 2013/0013184 | A1 * | 1/2013 | Morotomi | G08G 1/66 701/301 |
| 2013/0131925 | A1 * | 5/2013 | Isaji | B62D 6/00 701/41 |
| 2013/0173113 | A1 * | 7/2013 | Takiguchi | B60K 26/021 701/36 |
| 2013/0231825 | A1 * | 9/2013 | Chundrlik, Jr. | B60W 50/0098 701/29.1 |
| 2013/0304322 | A1 * | 11/2013 | Isaji | B62D 15/025 701/41 |
| 2014/0147007 | A1 * | 5/2014 | Hayakawa | G08G 1/167 382/103 |

FOREIGN PATENT DOCUMENTS

| | | |
|---|---|---|
| JP | 11-65660 A | 3/1999 |
| JP | 2000-198402 A | 7/2000 |
| JP | 2013126854 A * | 6/2013 |

* cited by examiner

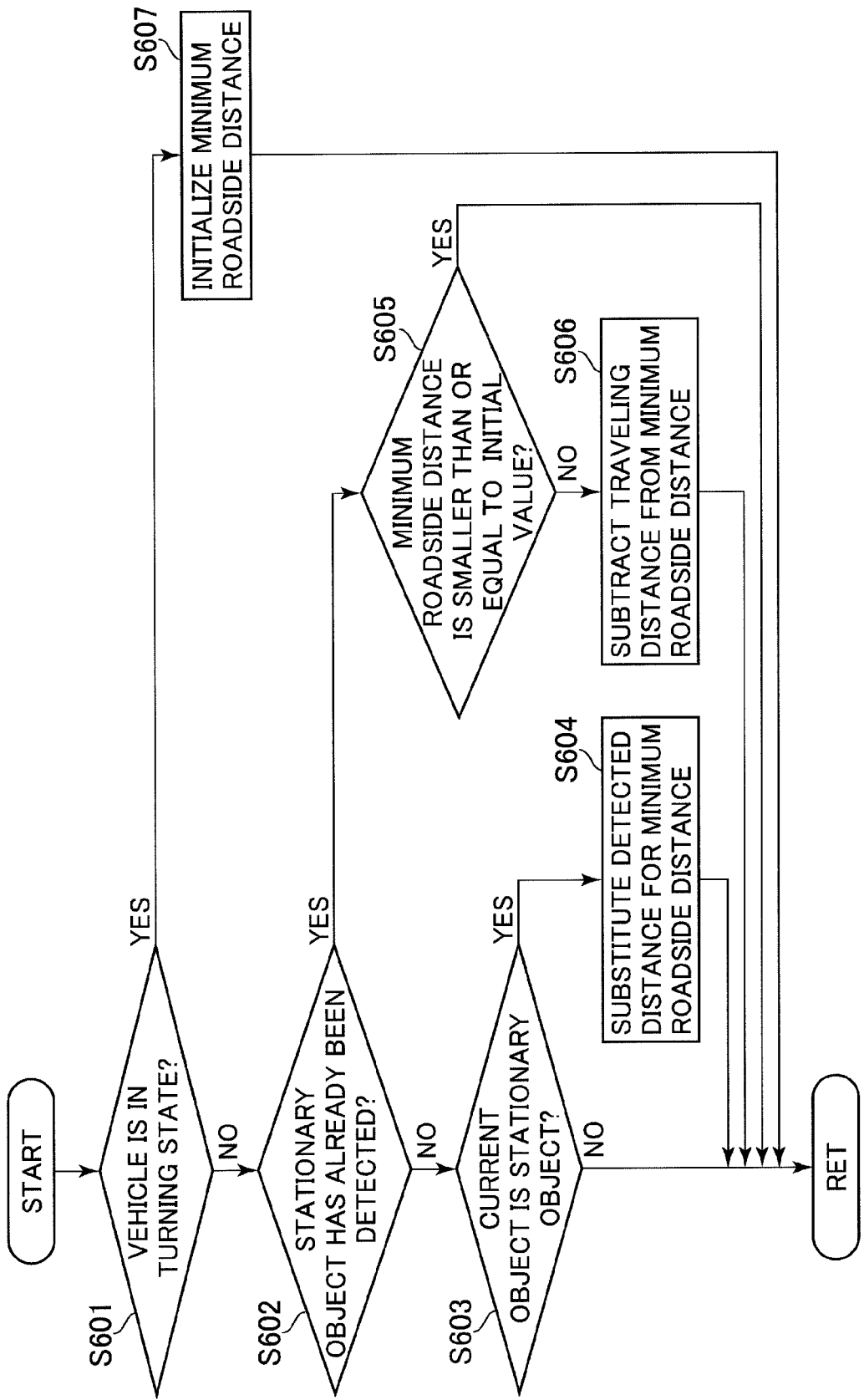

MINING VEHICLE

TECHNICAL FIELD

The present invention relates to a mining vehicle, and more particularly to a mining vehicle having a vehicle speed control unit configured to detect other vehicles traveling in front of the mining vehicle on a transport road of a mining site and to control a speed of the mining vehicle.

BACKGROUND ART

A mineral excavated at a mining site is loaded onto a mining vehicle such as a dump truck at an excavation site, transported by the mining vehicle and collected to a collection site or other places. The mining vehicle repeatedly travels back and forth between the excavation site and the collection site. For the better profit of mining business, it is requested that the transportation efficiency of the mining vehicle be enhanced.

For the sake of the improvement, there is a mining vehicle that has a radar device for measuring a distance to an obstacle located in front of the mining vehicle on a traveling road and to an object detection device for controlling a speed of the vehicle on the basis of information on the distance measured by the radar device. The mining vehicle is also capable of operating while automatically following multiple vehicles so as to make the distances between the mining vehicle and the multiple vehicles small. In addition, this vehicle has less resistance to air during traveling, can reduce a fuel cost, and improve a utilization rate of the transport road.

However, if the traveling road is curved, the radar device may erroneously detect an obstacle located outside the traveling road and reduce a speed of the vehicle regardless of the fact that a distance between the vehicle and other vehicles is sufficient.

Thus, an object detection device has been disclosed which calculates a turning radius of a vehicle on the basis of rotational angular velocities of wheels and acceleration of the vehicle in a horizontal direction. The device then determines, on the basis of the turning radius of the vehicle, an object detection region in which an object in front of the vehicle is detected (refer to, for example, Patent Document 1).

PRIOR ART DOCUMENT

Patent Document

Patent Document 1: JP-2000-198402-A

SUMMARY OF THE INVENTION

Problem to be Solved by the Invention

According to the aforementioned conventional technique, the object detection region is determined after the turning radius of the vehicle is calculated from the rotational angular velocities of the wheels. A problem with erroneous detection will not occur when the vehicle travels on a linear portion of the transport road or steadily turns on a curved portion of the transport road. Meanwhile, if there is a high upright wall surface on one side of a transport road, for example, at a mining site, the sight in front of the vehicle will not be appropriately recognized during the time when the vehicle is approaching a curved portion from a linear portion.

During the time when the vehicle approaches the curved portion from the linear portion, the rotational angular velocities of the wheels of the vehicle are still the same as those of the vehicle on the linear portion, and an object detection region in accordance with a linear portion is applied. However, a transport road in front of the vehicle is the curved portion, and the high upright wall surface located on the roadside is erroneously detected. As a result, the speed of the vehicle may be reduced regardless of the fact that a distance between the vehicle and another vehicle is sufficient, and the transport efficiency may be reduced.

The invention has been devised in consideration of the aforementioned facts. An object of the invention is to provide a mining vehicle that can appropriately recognize a condition of a traveling road located in front of the vehicle, prevent a distance detection unit from erroneously detecting an obstacle on a roadside even during the time when the vehicle is approaching a curved portion from a linear portion, and control the speed of the vehicle in a stable manner.

Means for Solving the Problem

In order to accomplish the aforementioned object, according to a first aspect of the invention, a mining vehicle includes: a distance detector configured to detect a distance between the vehicle traveling on a transport road of a mining site and an object in front of the vehicle on the transport road and a relative speed of the vehicle to the object; a minimum roadside distance determining unit configured to store a minimum roadside distance calculated from a shape of the transport road; a state quantity sensor configured to detect a state quantity of the vehicle; a traveling status calculator configured to calculate traveling status of the vehicle and a turning radius of the vehicle on the basis of the vehicle's state quantity detected by the state quantity sensor; a roadside distance calculator configured to calculate, on the basis of the calculated turning radius, a roadside distance between the vehicle and a roadside of the transport road; a roadside distance selector configured to select and output the minimum roadside distance on the basis of the calculated traveling status of the vehicle if the vehicle is in a rectilinearly traveling state and configured to select and output the roadside distance calculated with the roadside distance calculator on the basis of the calculated traveling status of the vehicle if the vehicle is in a turning state; a detected distance limiter configured to disable a signal representing the distance, detected with the distance detector, between the vehicle and the object in front of the vehicle and the relative speed if the distance between the vehicle and the object is larger than a distance represented by a signal selected and output from the roadside distance selector; and a vehicle speed controller configured to control the speed of the vehicle on the basis of a signal output from the detected distance limiter.

According to a second aspect of the invention, a mining vehicle includes a distance detector configured to detect a distance between the vehicle traveling on a transport road of a mining site and an object in front of the vehicle on the transport road and a relative speed of the vehicle to the object; a minimum roadside distance determining unit configured to store a minimum roadside distance calculated from a shape of the transport road; a state quantity sensor configured to detect a state quantity of the vehicle; a traveling status calculator configured to calculate traveling status of the vehicle and a turning radius of the vehicle on the basis of the vehicle's state quantity detected by the state quantity sensor; a roadside distance calculator configured to calculate, on the basis of the calculated turning radius, a roadside distance between the vehicle and a roadside of the transport road; a roadside distance selector configured to select and output the minimum roadside distance on the basis of the calculated traveling status of the vehicle if the vehicle is in a rectilinearly traveling state and configured to select and output the roadside distance calculated with the roadside distance calculator on the basis of the calculated traveling status of the vehicle if the vehicle is in a turning state; an object status determining unit configured to determine whether or not the object in front of the vehicle is a stationary object on the basis of the relative speed, detected by the distance detector, of the vehicle to the object in front of the vehicle and a vehicle's speed detected with the state quantity sensor; a detected distance limiter configured to disable, on the basis of a result of determination made by the object status determining unit and the traveling status of the vehicle, a signal having a distance between the vehicle and the object larger than a distance represented by a signal selected and output from the roadside distance selector, the signal representing the distance, detected with the distance detector, between the vehicle and the object in front of the vehicle and the relative speed; and a vehicle speed controller configured to control the speed of the vehicle on the basis of a signal output from the detected distance limiter.

According to a third aspect of the invention, in the mining vehicle according to the second aspect of the invention, if the object status determining unit determines that the object in front of the vehicle is the stationary object or the traveling status calculator determines that the traveling status is the turning state, the detected distance limiter disables the signal having the distance between the vehicle and the object larger than the distance represented by the signal selected and output from the roadside distance selector, the signal representing the distance, detected with the distance detector, between the vehicle and the object in front of the vehicle and the relative speed.

According to a fourth aspect of the invention, in the mining vehicle according to any of the first to third aspects of the invention, the minimum roadside distance determining unit stores, as an initial minimum roadside distance, the minimum roadside distance calculated from the shape of the transport road; the minimum roadside distance determining unit updates the minimum roadside distance so as to set a distance to the stationary object as a new minimum roadside distance when a stationary object in front of the vehicle is detected while the traveling status of the vehicle is the rectilinearly traveling state; and after the update until the traveling status of the vehicle becomes the turning state, the minimum roadside distance determining unit sequentially updates the minimum roadside distance by subtracting a traveling distance, calculated from the speed of the vehicle, of the vehicle from the minimum roadside distance.

Effect of the Invention

According to the invention, since a detected distance is limited on the basis of a shape of a transport road and traveling status of the vehicle, the vehicle is capable of appropriately recognizing a condition of the traveling road in front of the vehicle and preventing an obstacle located on a roadside from being erroneously detected. As a result, the mining vehicle capable of controlling the speed of the vehicle in a stable manner can be provided.

BRIEF DESCRIPTION OF THE DRAWINGS

FIG. 9 is a flowchart of details of a process of determining a minimum roadside distance of the control device included in the mining vehicle according to the fourth embodiment of the invention.

MODE FOR CARRYING OUT THE INVENTION

Hereinafter, embodiments of the invention are described with reference to the accompanying drawings. The embodiments describe, as an example, a dump truck that is a large transport vehicle serving as a mining vehicle and transports broken stones and minerals excavated at an open-air excavation site, a mining site, or the like. The invention is applicable to all mining vehicles, and the application of the invention is not limited to dump trucks.

FIRST EMBODIMENT

Figure 1:
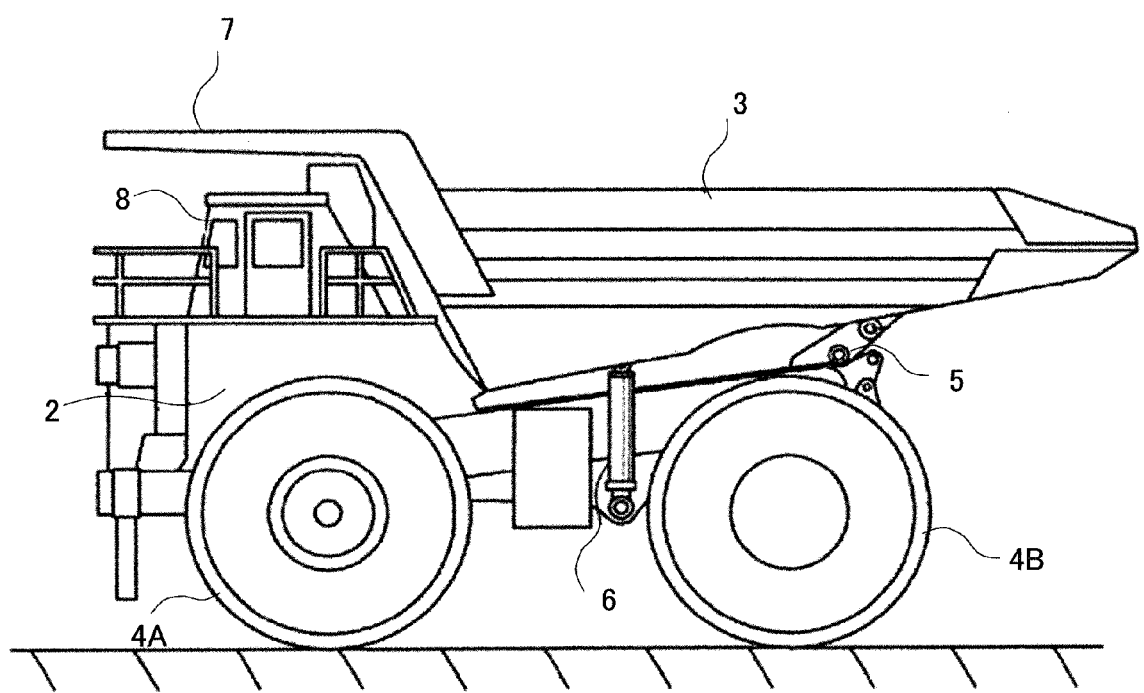
FIG. 1 is a side view of a mining vehicle according to a first embodiment of the invention.

FIG. 1 is a side view of a mining vehicle according to a first embodiment of the invention. The dump truck (vehicle) 1 illustrated in FIG. 1 mainly includes a vehicle body 2 formed of a robust frame structure, a vessel (bed) arranged on the vehicle body 2 and capable of being tilted, front wheels 4A coupled to the vehicle body 2, and rear wheels 4B coupled to the vehicle body 2.

The vehicle body 2 has an engine (not illustrated) for driving the rear wheels 4B. The engine includes an engine control unit (hereinafter referred to as an ECU), for example. A rotational speed of the engine is controlled by controlling, on the basis of a command signal from the ECU, a flow rate of a fuel to be supplied. A control device 100 (refer to FIG. 3) to be described later outputs a command signal to the ECU and thereby controls the speed of the vehicle 1.

The vessel 3 is provided in order to load materials such as broken stones and is coupled to the vehicle body 2 through a pin coupler 5 and the like so as to be capable of being tilted. Two tilting cylinders 6 are arranged under the vessel 3 and separated by a predetermined interval from each other in a width direction of the vehicle. When pressure oil is supplied to and discharged from the tilting cylinders 6, the tilting cylinders 6 are expanded and contracted so as to tilt the vessel 3. In addition, a canopy portion 7 is provided at a front upper portion of the vessel 3.

The canopy portion 7 has a function of protecting an operator's cab 8 arranged under the canopy portion 7 (or on a front portion of the vehicle body 2) from a scattering object such as a stone and another function of protecting the operator's cab 8 when the vehicle falls, for example. The control device 100 (refer to FIG. 3), a steering handle (not shown), an acceleration pedal, a brake pedal, and the like are arranged in the operator's cab 8.

The steering handle has a steering angle sensor 21 (refer to FIG. 3) configured to detect a steering angle of the handle. In addition, the rear wheels 4B have a wheel speed sensor 24 (refer to FIG. 3) configured to detect speeds of the wheels. In addition, the vehicle body 2 is provided with an acceleration sensor 22 (refer to FIG. 3) configured to detect acceleration of the vehicle body and with a yaw rate sensor 23 (refer to FIG. 3) configured to detect a yaw rate of the vehicle body.

In addition, A transmitter 101A of a distance detector 101 (refer to FIG. 3) to be described later and a receiver 101B (refer to FIG. 3) of the distance detector 101 are arranged on a front side surface of the vehicle body 2.

Figure 2:
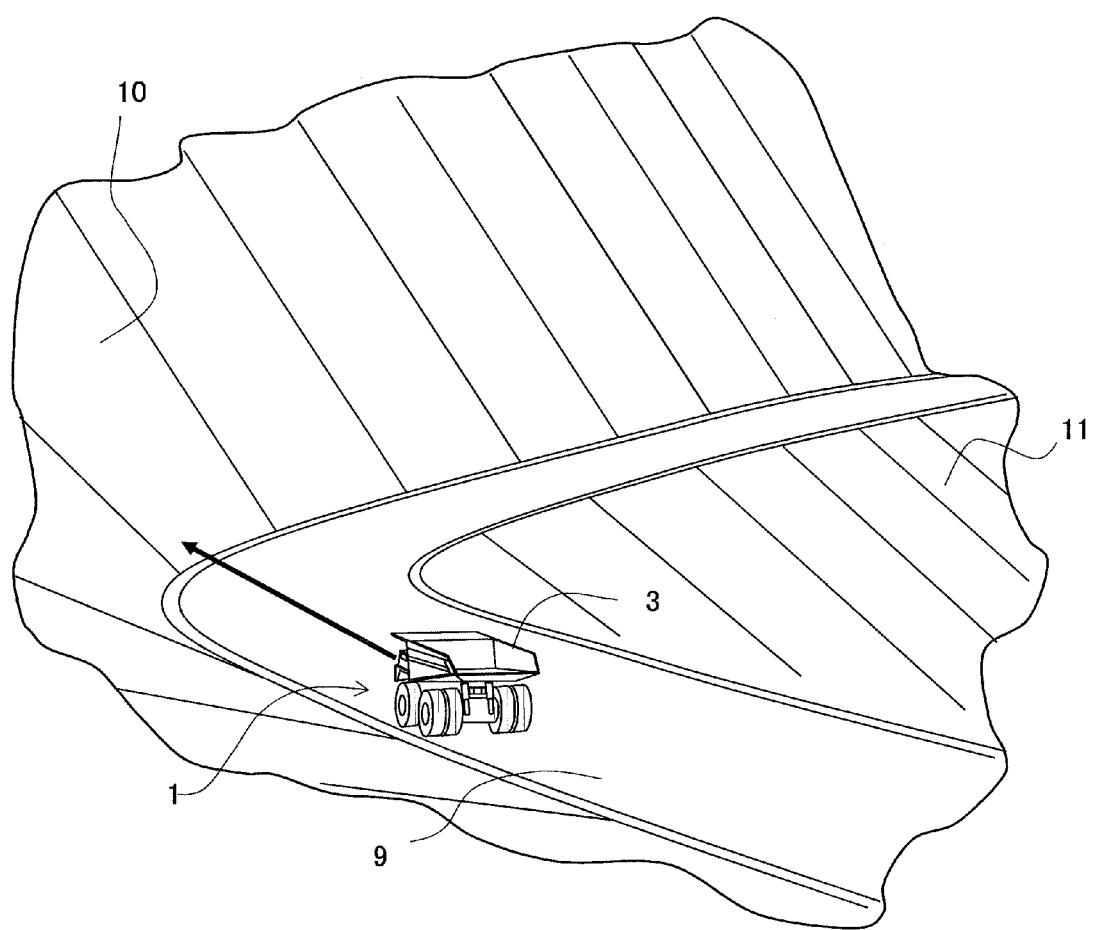
FIG. 2 is a perspective view of a state in which the mining vehicle according to the first embodiment of the invention travels on a transport road of a mining site.

FIG. 2 is a perspective view illustrating a state in which the mining vehicle according to the first embodiment of the invention travels on a transport road of a mining site. FIG. 2 that illustrates the transport road of the mining site indicates a bench cut open-air excavation method applied to a location at which a steep layered hematite deposit such as a hematite deposit in Australia continuously extends to a deep underground part. As illustrated in FIG. 2, a high upright wall surface 10 is formed on one roadside of the transport road 9, while a cliff-like wall surface 11 is formed on the other roadside of the transport road 9. A white line such as a central line is not provided on the transport road 9, unlike general roads. In general, the length of a linear portion of the transport road 9, the length of a curved portion of the transport road 9, a turning radius of the curved portion of the transport road 9, and the like can be recognized on a mining site map or the like in advance.

FIG. 2 illustrates a state in which the dump truck 1 unloads a mineral or the like from the vessel 3 at a collection site located at an upper part of the mining site or the like, travels toward the excavation site located at the mining deposit such as a bottom part of the mining site, and approaches the curved portion of the transport road 9 from the linear portion of the transport road 9. The present embodiment aims to enable the dump truck 1 to avoid erroneously detecting the high upright wall surface 10 located in front of the dump truck 1 and control the speed of the vehicle in a stable manner even when the dump truck is in such a state.

Figure 3:
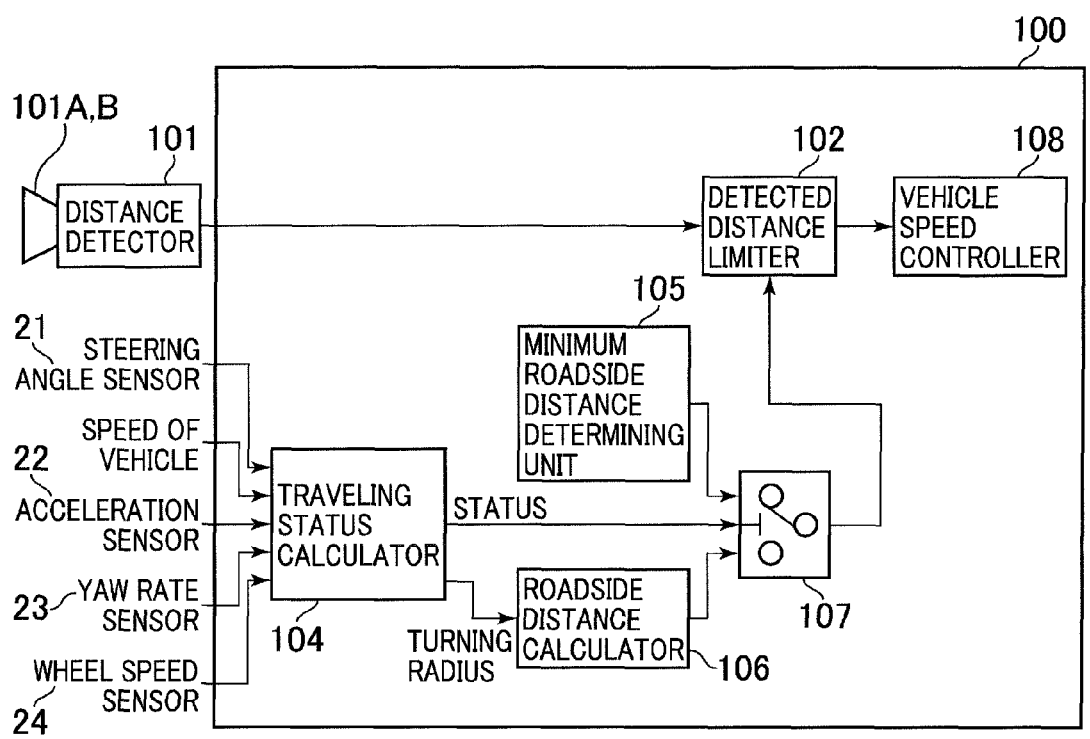
FIG. 3 is a control block diagram illustrating a configuration of a control device included in the mining vehicle according to the first embodiment of the invention.

FIG. 3 is a control block diagram illustrating a configuration of the control device included in the mining vehicle 1 according to the first embodiment of the invention.

With reference to FIG. 3, the control device 100 includes a detected distance limiter 102, a traveling status calculator 104, a minimum roadside distance determining unit 105, a roadside distance calculator 106, a roadside distance selector 107, and a vehicle speed controller 108. In addition, the control device 100 receives a steering handle angle signal detected by the steering angle sensor 21, a vehicle speed signal calculated by the ECU, a vehicle acceleration signal detected by the acceleration sensor 22, a yaw rate signal detected by the yaw rate sensor 23, and a wheel speed signal detected by the wheel speed sensor 24 input thereto. Furthermore, a vehicle speed command signal to control the speed of the vehicle is output from the control device 100 to the ECU. The steering angle sensor 21, the acceleration sensor 22, the yaw rate sensor 23, and the vehicle speed sensor 24 function as sensors configured to detect state quantity of the dump truck 1.

The distance detector 101 includes the transmitter 101A, the receiver 101B, and a calculator. The transmitter 101A emits a radio wave such as a millimeter wave or light such as laser light to a detection range located in front of the vehicle 1. The receiver 101B detects the radio wave incident on and reflected from an object in front of the vehicle 1 or the light incident on and reflected from the object in front of the vehicle 1. The calculator calculates, on the basis of the radio wave transmitted and received by the transmitter and the receiver or the light transmitted and received by the transmitter and the receiver, a distance between the vehicle 1 and the object in front of the vehicle 1 and further calculates a relative speed of the vehicle 1 to the object. The signals, which represent the distance, calculated by the distance detector 101, between the vehicle 1 and the object in front of the vehicle 1 and further represent the relative speed, calculated by the distance detector 101, of the vehicle to the object, are output to the detected distance limiter 102.

Although details of the detected distance limiter 102 are to be described later, the detected distance limiter 102 receives, from the distance detector 101, the signal representing the distance between the vehicle 1 and the object in front of the vehicle 1 and the relative speed of the vehicle 1 to the object and receives a distance signal from the roadside distance selector 107. If the distance between the vehicle 1 and the object in front of the vehicle 1 is larger than a distance represented by the distance signal received from the roadside distance selector 107, the detected distance limiter 102 limits the output of the signal representing the distance between the vehicle 1 and the object in front of the vehicle 1 and the relative speed of the vehicle 1 to the object. The signal of which the output is limited by the detected distance limiter 102 is output to the vehicle speed controller 108.

The vehicle speed controller 108 controls the speed of the vehicle on the basis of the signal received from the detected distance limiter 102 and representing the distance between the vehicle 1 and the object in front of the vehicle 1 and the relative speed of the vehicle 1 to the object. The vehicle speed controller 108 outputs a vehicle speed command signal to the ECU, controls breaking and driving torque of the vehicle 1, and thereby controls the speed of the vehicle so as to set the speed at a desired level. Specifically, 'leading vehicle following control' for controlling the speed of the vehicle so as to maintain a distance between the interested vehicle and another vehicle traveling in front of the interested vehicle at a constant level is performed as an example.

The traveling status calculator 104 receives the steering handle angle signal detected by the steering angle sensor 21, the vehicle speed signal calculated by the ECU, the vehicle acceleration signal detected by the acceleration sensor 22, the yaw rate signal detected by the yaw rate sensor 23, and the wheel speed signal detected by the wheel speed sensor 24 input thereto. The traveling status calculator 104 estimates a behavior of the vehicle on the basis of these vehicle state quantity signals and calculates whether the vehicle 1 is in a rectilinearly traveling state or a turning state. If the vehicle 1 is in the turning state, the traveling status calculator 104 calculates a turning radius. A signal that represents traveling status calculated by the traveling status calculator 104 is output to the roadside distance selector 107, while a signal of the turning radius is output to the roadside distance calculator 106.

All the information on the aforementioned sensors does not need to be used as the signals input to the traveling status calculator 104, and types of the information are not limited to the aforementioned ones.

As a method for calculating the status of turning, the turning state may be simply determined on the basis of a front wheel steering angle detected by the steering angle sensor 21, or the turning radius of the vehicle 1 may be calculated from the difference between rotational speeds, detected by the wheel speed sensor 24, of the inner and outer wheels and a wheel base (distance between the left and right wheels) of the vehicle. The quantity of the turning state of the vehicle 1 may be estimated from information on the acceleration and the yaw rate with the use of a vehicle turning motion model.

The minimum roadside distance determining unit 105 stores a minimum roadside distance determined on the basis of a transport road's shape obtained from the mining site map or the like in advance. The minimum roadside distance determining unit 105 outputs, to the roadside distance selector 107, a signal of the minimum roadside distance.

Figure 4:
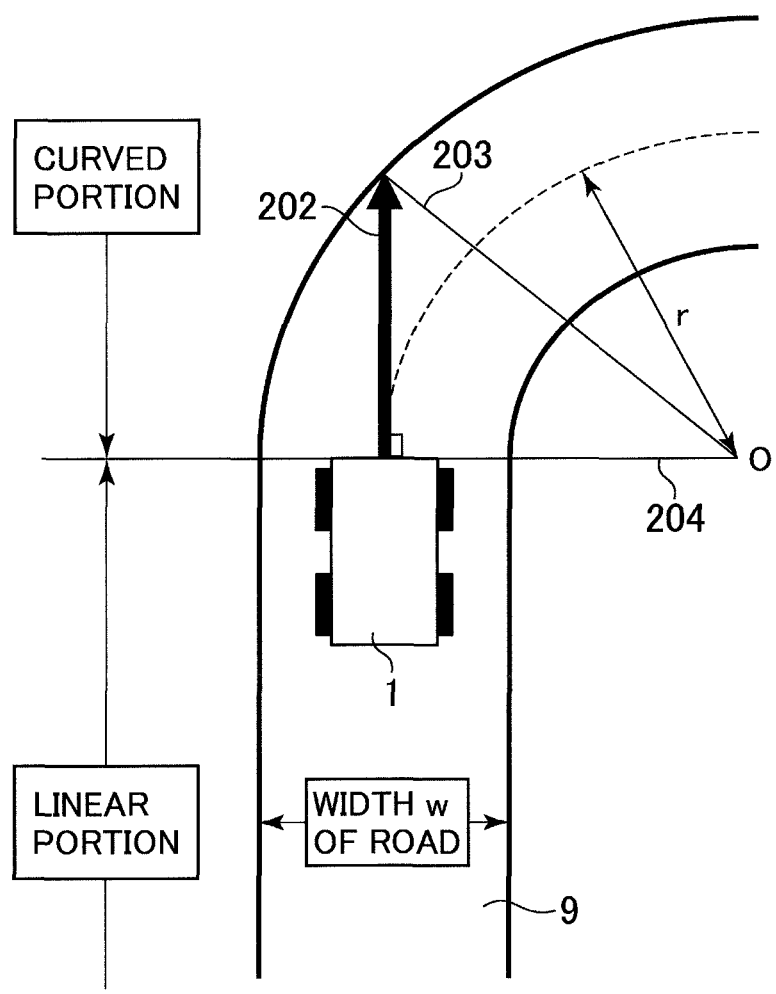
FIG. 4 is a schematic diagram illustrating a transport road and describing a method for calculating a minimum roadside distance of the mining vehicle according to the first embodiment of the invention.

A method for calculating the minimum roadside distance will now be described with reference to FIG. 4. FIG. 4 is a schematic diagram illustrating the transport road and describing the method for calculating the minimum roadside distance of the mining vehicle according to the first embodiment of the invention.

FIG. 4 illustrates the mining vehicle 1 when viewed from above, the vehicle 1 traveling on the transport road 9 of the mining site illustrated in FIG. 2. With reference to FIG. 4, the roadside distance is, for example, a distance 202 between the vehicle 1 and the wall surface 10 located on the roadside in front of the vehicle 1 on the curved portion of the transport road 9. The minimum roadside distance is the roadside distance 202 having the smallest distance on the transport road 9 in the overall mining site. In FIG. 4, a symbol O represents a central point of the turning on the curved portion of the transport road 9, a reference numeral 204 represents a distance between the central point O of the turning and the mining vehicle 1, a reference numeral 203 represents a distance between the central point O of the turning and the wall surface 10 located on the roadside in front of the vehicle 1, a symbol w represents the width of the transport road 9, and a symbol r represents the turning radius on the curved portion of the transport road 9.

In order to simplify the following description, it is assumed that the curved portion of the transport road 9 is an arc with a constant turning radius r. The length L of the roadside distance 202 can be expressed by the following Equation (1) on the basis of a relation between the lengths 202, 203, and 204 of three sides of a right triangle.

$$L = \sqrt{(rw + w^2/4)} \quad (1)$$

As a result, the minimum roadside distance can be calculated from Equation (1) by extracting the curved road portion with the width w and the turning radius r.

Returning to FIG. 3, the roadside distance calculator 106 receives the turning radius calculated by the traveling status calculator 104 and uses Equation (1) to calculate a roadside distance in real time. The width w of the transport road 9 does not significantly vary in the same mining site in general. Thus, if the width w is a constant value, the length L of the roadside distance is a function of the turning radius r. Specifically, the length L of the roadside distance when the vehicle 1 is in a traveling state can be calculated from the turning radius r calculated by the traveling status calculator 104. A signal of the roadside distance calculated with the roadside distance calculator 106 when the vehicle 1 is in the traveling status is output to the roadside distance selector 107.

The roadside distance selector 107 selects a limited distance signal to be output to the detected distance limiter 102, on the basis of the signal of the traveling status, calculated by the traveling status calculator 104, of the vehicle 1. Specifically, if the vehicle 1 is in the rectilinearly traveling state, the roadside distance selector 107 selects the minimum roadside distance determined by the minimum roadside distance determining unit 105. If the vehicle is in the turning state, the roadside distance selector 107 selects the roadside distance calculated with the roadside distance calculator 106 on the basis of the turning radius r calculated by the traveling status calculator 104. A signal of a roadside distance selected by the roadside distance selector 107 is output to the detected distance limiter 102.

If the vehicle 1 is in the rectilinearly traveling state, the detected distance limiter 102 receives the minimum roadside distance. If the vehicle 1 is in the turning state, the detected distance limiter 102 receives the roadside distance when the vehicle 1 is in the traveling status. Thus, a signal, which represents a distance between the vehicle 1 and an object in front of the vehicle 1 and separated from the vehicle 1 by a distance larger than the distances represented by the signals and a relative speed of the vehicle 1 to the object, is not output to the vehicle speed controller 108 but is disabled.

Thus, during the time when the vehicle 1 is traveling, if the vehicle 1 is in the rectilinearly traveling state, an object, which is separated from the vehicle 1 by a distance smaller than the minimum roadside distance determined on the basis of the transport road's shape obtained from the mining site map or the like, is detected as an obstacle. Moreover, if the vehicle 1 is in the turning state, an object, which is separated from the vehicle 1 by a distance smaller than the roadside distance calculated from the turning radius of the vehicle 1, is detected as an obstacle. The information on the detected object is used for control on the speed of the vehicle or used to support avoidance of collision. As a result of adopting the aforementioned control method, it is possible to prevent an object (for example, the high upright wall surface 10 in front) located on a roadside of the transport road 9 from being erroneously detected as an obstacle. It is accordingly possible to provide the mining vehicle capable of controlling the speed of the vehicle in a stable manner.

Since the mining vehicle according to the first embodiment of the invention limits a detected distance on the basis of the shape of the transport road 9 and traveling status of the vehicle 1, the mining vehicle can appropriately recognize a condition of the traveling road in front of the vehicle and can prevent an object located on a roadside from being erroneously detected as an obstacle. As a result, it is possible to provide the mining vehicle 1 capable of controlling the speed of the vehicle in a stable manner.

SECOND EMBODIMENT

Figure 5:
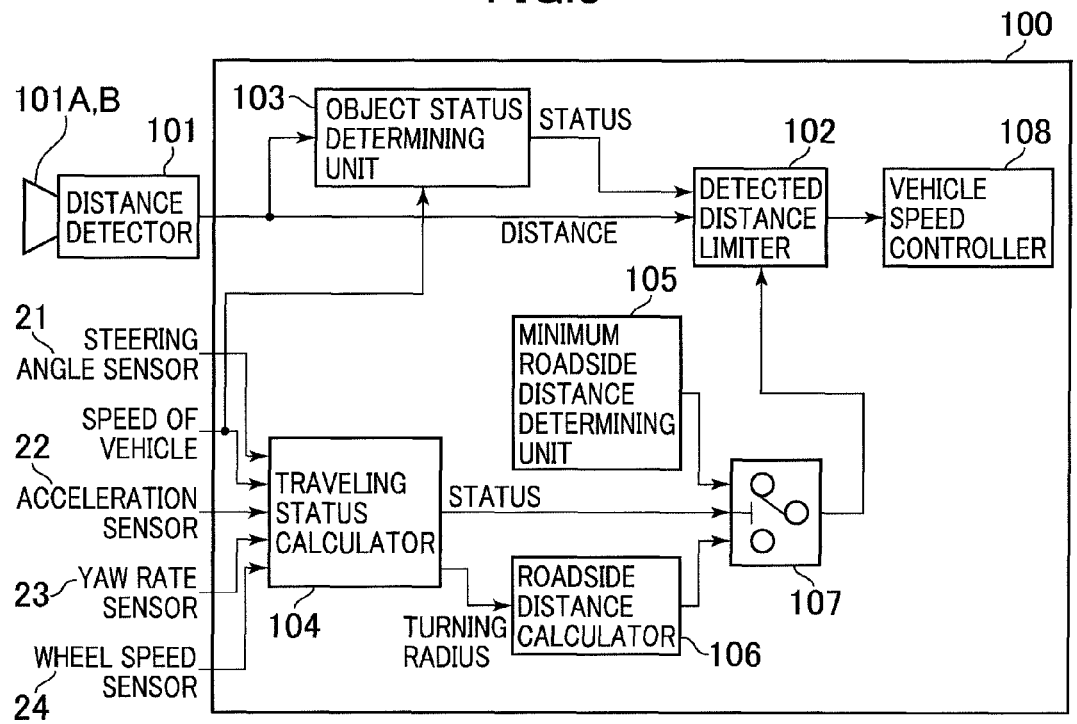
FIG. 5 is a control block diagram illustrating a configuration of the control device included in the mining vehicle according to a second embodiment of the invention.

Hereinafter, the mining vehicle according to a second embodiment of the invention will be described with reference to the accompanying drawings. FIG. 5 is a control block diagram illustrating a configuration of the control device included in the mining vehicle according to the second embodiment of the invention. In FIG. 5, reference numerals that are the same as those illustrated in FIGS. 1 to 4 denote the same parts as those illustrated in FIGS. 1 to 4, and hence, a detailed description thereof is omitted.

Although the mining vehicle according to the second embodiment of the invention is illustrated in FIG. 5 and structured from devices that are substantially the same as the first embodiment, the following configuration is different from the first embodiment.

The mining vehicle according to the second embodiment of the invention includes an object status determining unit 103 as well as the configuration of the control device 100 according to the first embodiment. This structure makes it possible for the mining vehicle according to the second embodiment of the invention to determine whether or not a detected object is a stationary object.

The object status determining unit 103 receives a signal representing a relative speed, calculated by the distance detector 101, of the vehicle 1 to an object in front of the vehicle 1 and another signal representing a vehicle speed calculated by the ECU and determines, on the basis of the signals, whether or not the detected object in front of the vehicle 1 is a stationary object. The distance detector 101 emits a millimeter wave or laser light to a detection range, measures the time of flight of the wave or laser light and a phase difference of the wave or laser light by detecting the radio wave incident on and reflected from the object or the light incident on and reflected from the object, and thereby can appropriately detect a distance between the vehicle and the object in front of the vehicle and a relative speed of the vehicle to the object in front of the vehicle. If an approach speed of the object in front of the vehicle is equal to the speed of the vehicle, when both are compared, the object status determining unit 103 can determine that the detected object is a stationary object. The object status determining unit 103 outputs, to the detected distance limiter 102, a determination signal representing the determination of whether or not the object in front of the vehicle 1 is the stationary object.

A moving object in the mining site means another vehicle. In addition, on the basis of a sign of the difference between the approach speed of the object and the speed of the interested vehicle, it is possible to determine whether the object is a vehicle (or a vehicle coming from the opposite direction on the transport road 9 in other words) traveling toward the interested vehicle or a vehicle (or a vehicle traveling in front of the vehicle on the transport road 9 in other words) traveling in the same direction as the interested vehicle.

Specifically, the determination signal output from the object status determining unit 103 may represent not only the determination of whether the object is the aforementioned stationary object or the moving object but also the determination of whether or not the object is the stationary object, the vehicle traveling in front of the interested vehicle, or the vehicle traveling in the opposite direction. Thus, there is an advantage in that a detected distance can be appropriately limited for each of obstacles on the basis of determination of whether a detected object is the wall surface 10 located on the roadside or the vehicle traveling in front.

The mining vehicle according to the second embodiment of the invention can provide the same advantages as the first embodiment.

In addition, since the mining vehicle according to the second embodiment of the invention can determine whether the object in front of the vehicle 1 is the wall surface 10 located on the roadside or the vehicle traveling in front, a detected distance can be appropriately limited for each of obstacles. As a result, the speed of the vehicle can be controlled in a more stable manner.

THIRD EMBODIMENT

Figure 6:
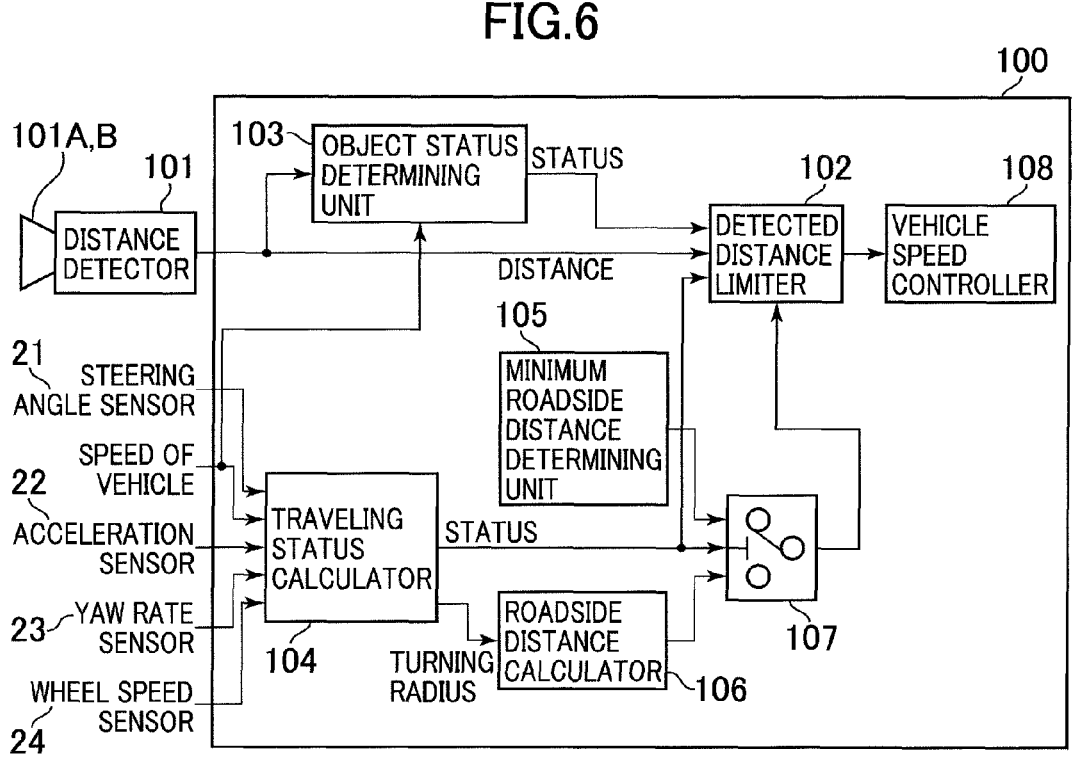
FIG. 6 is a control block diagram illustrating a configuration of the control device included in the mining vehicle according to a third embodiment of the invention.
Figure 7:
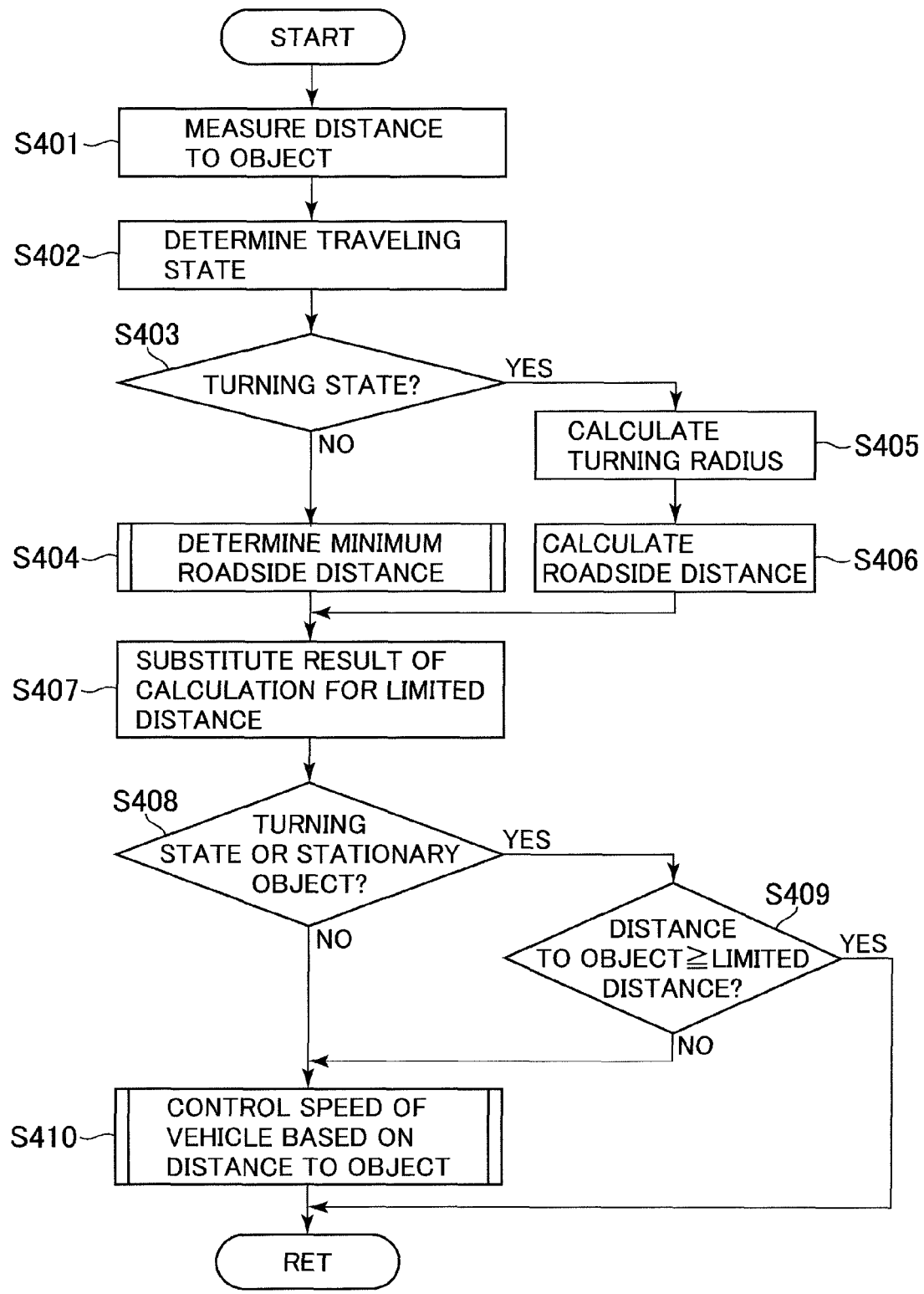
FIG. 7 is a flowchart of details of a process to be performed by the control device included in the mining vehicle according to the third embodiment of the invention.

Hereinafter, the mining vehicle according to a third embodiment of the invention will be described with reference to the accompanying drawings. FIG. 6 is a control block diagram illustrating a configuration of the control device included in the mining vehicle according to the third embodiment of the invention. FIG. 7 is a flowchart of details of a process to be executed by the control device included in the mining vehicle according to the third embodiment of the invention. In FIGS. 6 and 7, reference numerals that are the same as those illustrated in FIGS. 1 to 5 denote the same parts as those illustrated in FIGS. 1 to 5, and hence, a detailed description thereof is omitted.

Although the mining vehicle according to the third embodiment of the invention is illustrated in FIG. 6 and configured by devices that are substantially the same as the second embodiment, the following configuration is different from the second embodiment.

In the configuration of the control device 100 according to the second embodiment, the signal that represents the traveling status, calculated by the traveling status calculator 104, of the vehicle 1 is input to the detected distance limiter 102. Thus, if the detected object is the stationary object or the traveling status of the vehicle 1 is the turning state, the detected distance limiter 102 limits the detected distance and does not limit a distance to a moving object to be detected when the vehicle 1 is in the rectilinearly traveling state.

A procedure for the details of the process according to the present embodiment will be described with reference to FIG. 7. It is assumed that the control device 100 of the mining vehicle 1 executes the process illustrated in FIG. 7 for each of determined process cycles.

The control device 100 first measures a distance to an object in front of the vehicle 1 (in step S401). Specifically, the distance detector 101 such as a radar device arranged on a front side of the vehicle 1 detects an obstacle located in front of the vehicle 1. It is assumed that the distance detector 101 can measure the distance to the obstacle and a relative speed of the vehicle 1 to the object, like a general radar device.

The control device 100 determines traveling status of the vehicle 1 (in step S402). Specifically, the traveling status calculator 104 determines the traveling status including the turning state of the vehicle 1.

The control device 100 determines whether or not the traveling status of the vehicle 1 is the turning state (in step S403). If the traveling status of the vehicle 1 is the turning state, the process proceeds to step S405. If the traveling status of the vehicle 1 is not the turning state, the process proceeds to step S404.

The control device 100 determines the minimum roadside distance (in step S404). Specifically, the minimum roadside distance determined by the minimum roadside distance determining unit 105 is output from the roadside distance selector 107. In other words, a limited value of the detected distance is determined on the basis of the minimum roadside distance obtained at the moment when the vehicle enters the curved portion from the rectilinearly traveling state.

If the control device 100 determines that the traveling status of the vehicle 1 is the turning state (in step S403), on the other hand, the control device 100 calculates the turning radius (in step S405). Specifically, the traveling status calculator 104 calculates the turning radius.

The control device 100 calculates a roadside distance (in step S406). Specifically, the roadside distance calculator 106 calculates, on the basis of the turning radius calculated in step 403, the roadside distance in the traveling status of the vehicle 1. And the calculated roadside distance is then output from the roadside distance selector 107. In this manner, the appropriate roadside distance is determined on the basis of the determination of whether or not the traveling status is the turning state in step S403.

The control device 100 substitutes the result of the calculation for the limited distance (in step S407). Specifically, a roadside distance selected by the roadside distance selector 107 is input to and stored in the detected distance limiter 102.

The control device 100 determines whether the vehicle 1 is in the turning state or the obstacle located in front of the vehicle 1 is a stationary object (in step S408). Specifically, if the object status determining unit 103 determines that the vehicle 1 is in the turning state or the detected obstacle located in front of the vehicle 1 is the stationary object in accordance with a signal representing the determination of whether the detected obstacle located in front of the vehicle 1 is the stationary object and a signal representing traveling status calculated by the traveling status calculator 104, the process proceeds to step S409. If the vehicle 1 is in the rectilinearly traveling state and the detected object in front of the vehicle 1 is a moving object, the process proceeds to step S410.

The control device 100 controls the speed of the vehicle on the basis of the distance to the object (in step S410). Specifically, the vehicle speed controller 108 controls the speed of the vehicle so as not to cause the detected distance limiter 102 to limit the detected distance. The control of the speed of the vehicle based on the distance includes inter-vehicle distance control to be executed to maintain the distance to the object traveling in front or the distance between the vehicles at a constant level and collision prevention control to be performed to execute emergency avoidance breaking in order to prevent the vehicle from colliding with the object traveling in front of the vehicle on the traveling road.

Meanwhile, after determining that the vehicle 1 is in the turning state or the detected object in front of the vehicle 1 is the stationary object (in step S408), the control device 100 determines whether or not the distance to the detected object in front of the vehicle 1 is larger than or equal to the limited distance stored in step S408 (in step S409). Specifically, the detected distance limiter 102 compares the distance, detected by the distance detector 101, between the vehicle 1 and the detected object in front of the vehicle 1 with the limited distance stored in step S408. If the distance to the detected object in front of the vehicle 1 is larger than or equal to the limited distance stored in step S408, the process proceeds to RETURN, information on the detected object is cleared, and this process procedure is terminated.

On the other hand, if the distance to the detected object in front of the vehicle 1 is smaller than the limited distance stored in step S408, the process proceeds to step S410. In this case, the control device 100 controls the speed of the vehicle on the basis of the aforementioned distance to the object. However, only if the vehicle 1 is in the turning state or the detected object in front of the vehicle 1 is the stationary object, and the distance to the detected object in front of the vehicle 1 is smaller than the limited distance, the control device 100 controls the speed of the vehicle on the basis of the detected distance to the object.

The control device 100 executes the aforementioned processes. Thus, according to the present embodiment, if the vehicle 1 is in the rectilinearly traveling state and a stationary object such as the wall surface 10 located on the roadside is separated from the vehicle 1 by a distance smaller than the minimum roadside distance determined from the shape, obtained from the mining site map or the like, of the transport road 9, the object is detected as an obstacle. In addition, all moving objects including a vehicle traveling in front are detected as obstacles. The information on the detected obstacles is used for the vehicle speed control to be executed to support avoidance of collision and the like.

On the other hand, if the vehicle 1 is traveling while being in the turning state, an object separated from the vehicle 1 by a distance smaller than the roadside distance calculated from the turning radius of the vehicle 1 is detected as an obstacle. The information on the detected object is then used for the vehicle speed control to be executed to support avoidance of collision and the like.

The mining vehicle according to the third embodiment of the invention can provide the same advantages as the first embodiment.

In addition, the mining vehicle according to the third embodiment of the invention can appropriately prevent a stationary object located on the roadside of the transport road 9 from being erroneously detected as an obstacle even immediately before the vehicle 1 enters the curved portion of the road from the linear portion of the road and even if the vehicle 1 is turning on the curved portion of the road. Furthermore, regarding a moving object such as a vehicle traveling straight in front, the vehicle speed control can be executed on the basis of a maximum detectable distance without deteriorating distance detection performance of the distance detector 101 such as the radar device.

FOURTH EMBODIMENT

Figure 8:
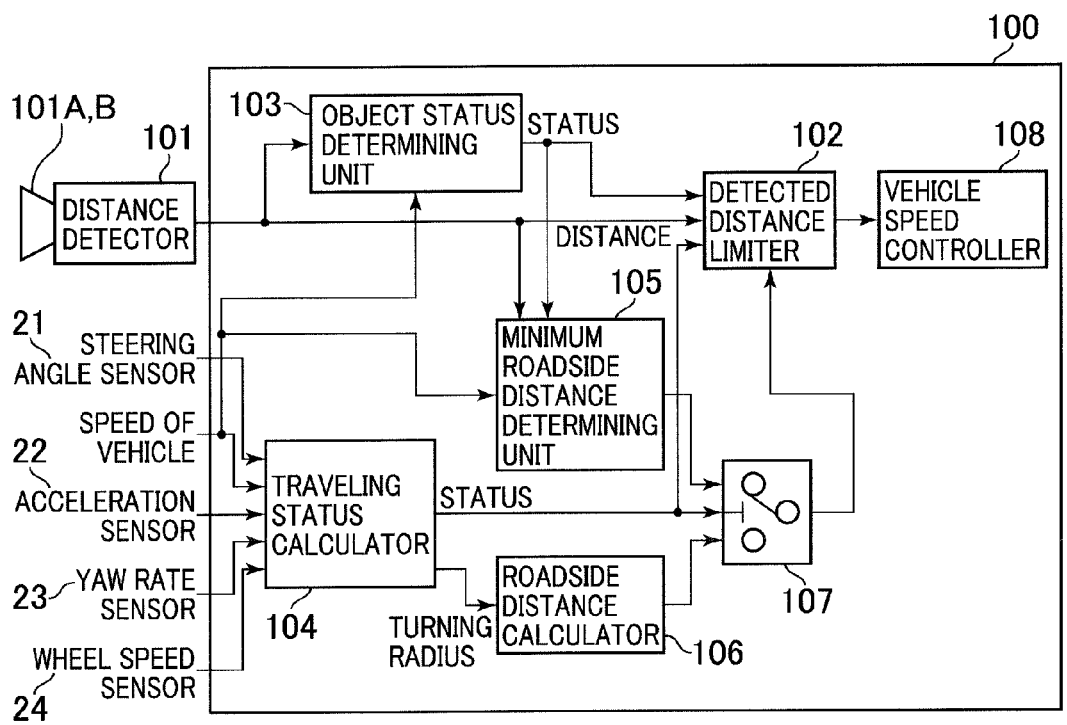
FIG. 8 is a control block diagram illustrating a configuration of the control device included in the mining vehicle according to a fourth embodiment of the invention.

Hereinafter, the mining vehicle according to a fourth embodiment of the invention will be described with reference to the accompanying drawings. FIG. 8 is a control block diagram illustrating a configuration of the control device included in the mining vehicle according to the fourth embodiment of the invention. FIG. 9 is a flowchart of details of a process of "determining a minimum roadside distance" by the control device included in the mining vehicle according to the fourth embodiment of the invention. In FIGS. 8 and 9, reference numerals that are the same as those illustrated in FIGS. 1 to 7 denote the same parts as those illustrated in FIGS. 1 to 7, and a detailed description thereof is omitted.

Although the mining vehicle according to the fourth embodiment of the invention is illustrated in FIG. 8 and configured by devices that are substantially the same as in the third embodiment, the following configuration is different from the third embodiment.

In the configuration of the control device 100 according to the third embodiment, the minimum roadside distance determining unit 105 receives the distance signal representing the distance, calculated by the distance detector 101, between the vehicle 1 and the object in front of the vehicle 1, the determination signal representing that the object status determining unit 103 determines whether or not the object in front of the vehicle 1 is the stationary object, and the signal representing the vehicle speed calculated by the ECU. The minimum roadside distance determining unit 105 can update the minimum roadside distance on the basis of these signals and in accordance with the situation. Thus, the minimum roadside distance can be set at an appropriate level on the basis of information on a detected obstacle and thereby be updated while a change of a distance to the obstacle due to a movement of the vehicle 1 is reflected in the minimum roadside distance.

The minimum roadside distance determining unit 105 according to the present embodiment receives the aforementioned signals and updates an initial minimum roadside distance set in advance. The initial minimum roadside distance is determined on the basis of the transport road's shape obtained from the map of the mining site or the like in the same manner as the aforementioned other embodiments.

An outline of details of a process to be executed by the minimum roadside distance determining unit 105 is as follows.

(1) If the distance detector 101 detects an obstacle and the object status determining unit 103 determines that the obstacle is a stationary object while the vehicle 1 is traveling on the linear portion of the transport road 9, the minimum roadside distance determining unit 105 assumes that the wall surface 10 located on the roadside or the like exists at a position at which the obstacle is detected.

(2) The minimum roadside distance determining unit 105 sets the distance to the detected object after changing the initial minimum roadside distance to the distance to the detected obstacle described in (1).

(3) The minimum roadside distance determining unit 105 updates the minimum roadside distance in such a manner to reduce the minimum roadside distance set in (2) by an approached distance to the aforementioned obstacle (wall surface 10 located on the roadside) as a result that the vehicle 1 travels. The reduced approach distance, calculated from the speed of the vehicle 1 and a process cycle of the control device 100, is a distance by which the vehicle 1 travels within the process cycle.

A procedure for details of the process to be executed by the control device 100 according to the present embodiment is performed substantially in accordance with the procedure illustrated in FIG. 7 according to the third embodiment. A feature of the present embodiment lies in the details of the process of "determining the minimum roadside distance" (in step S404). A procedure for the details of the process of "determining the minimum roadside distance" according to the present embodiment will be described with reference to FIG. 9.

The control device 100 first determines whether or not the vehicle 1 is in the turning state (in step S601). If the vehicle 1 is in the turning state, the process proceeds to step S607. If the vehicle 1 is not in the turning state, the process proceeds to step S602.

If the vehicle 1 is in the turning state, the control device 100 initializes the minimum roadside distance (in step S607). Specifically, the minimum roadside distance determining unit 105 initializes the minimum roadside distance so as to set the initial minimum roadside distance determined on the basis of the transport road's shape obtained from the map of the mining site or the like. Then, the process proceeds to RETURN, a stationary object detection flag is cleared, and the control device 100 prepares for a stationary object to be next detected when the vehicle 1 is in the rectilinearly traveling state.

On the other hand, if the control device 100 determines that the vehicle 1 is not in the turning state (in step S601), the control device 100 determines whether or not a stationary object has already been detected (in step S602). Specifically, a flag for the determination signal that represents that the object status determining unit 103 determines whether or not the detected object in front of the vehicle 1 is the stationary object is considered to be used. If an object in front of the vehicle 1 has already been detected as the stationary object, the process proceeds to step S605. If the object in front of the vehicle 1 has not been detected as the stationary object, the process proceeds to step S603.

If the object in front of the vehicle 1 has not been detected as the stationary object, the control device 100 determines whether or not an object that is currently detected is a stationary object (in step S603). Specifically, the object status determining unit 103 makes the determination. If the object that is currently detected is the stationary object, the process proceeds to step S604. If the object that is currently detected is not the stationary object, the process proceeds to RETURN.

If the object that is currently being detected is the stationary object, the control device 100 substitutes a detected distance for the minimum roadside distance (in step S604). Specifically, the minimum roadside distance determining unit 105 first sets, as the minimum roadside distance, the distance, detected with the distance detector 101, between the vehicle 1 and the detected object in front of the vehicle 1. It is thereby possible to update the minimum roadside distance to the distance, detected in the rectilinearly traveling state, between the vehicle 1 and the stationary object as a new minimum roadside distance.

On the other hand, if the control device 100 determines that the object in front of the vehicle 1 has already been detected as the stationary object in step S602, the control device 100 determines whether or not a current minimum roadside distance is smaller than or equal to the initial value set in advance (in step S605). Specifically, the minimum roadside distance determining unit 105 compares the current minimum roadside distance with the initial value set in advance. If the current minimum roadside distance is smaller than or equal to the initial value set in advance, the process proceeds to RETURN. If the current minimum roadside distance is larger than the initial value set in advance, the process proceeds to step S606.

If the minimum roadside distance determining unit 105 determines that the current minimum roadside distance is larger than the initial value set in advance, the control device 100 subtracts a traveling distance of the vehicle from the minimum roadside distance (in step S606). Specifically, the minimum roadside distance determining unit 105 subtracts the approach distance of the vehicle 1 within the process cycle from the minimum roadside distance and resets the minimum roadside distance. After that, the minimum roadside distance determining unit 105 continues to update the set value until the minimum roadside distance becomes smaller than or equal to the initial value.

Thus, a distance to a stationary object detected in the past can be used as a limited distance while being updated on the basis of a traveling distance of the vehicle 1. In addition, a lower value of the limited distance is the initial minimum roadside distance determined on the basis of the shape of the transport road. Thus, for example, even if a stationary obstacle, which is located on the road and is not an obstacle that is the wall surface 10 or the like and is located on the roadside, is detected in the state in which the vehicle 1 is traveling straight, the obstacle is determined to be a stationary obstacle when the vehicle is approaching the obstacle by a distance smaller than the initial minimum roadside distance. Thus, the speed of the vehicle can be controlled in accordance with a distance between the obstacle and the vehicle.

The mining vehicle according to the fourth embodiment of the invention can provide the same advantages as the aforementioned first embodiment.

The mining vehicle according to the fourth embodiment of the invention can set and update the minimum roadside distance appropriate for current circumstances by use of the information detected by the distance detector 101 immediately before the vehicle enters the curved portion of the road from the linear portion of the road. It is thereby possible to provide the mining vehicle capable of controlling the speed of the vehicle by effective use of the distance detection performance of the distance detector 101.

Although the embodiments of the invention are described above, each example is provided by way of explanation of the invention, not limitation of the invention. In fact, it will be apparent to those skilled in the art that modifications and variations can be made in the present invention without departing from the scope or spirit thereof.

REFERENCE NUMERALS

1 Dump truck (mining vehicle)
2 Vehicle body

3 Vessel
8 Operator's cab
9 Transport road
10 Wall surface
21 Steering angle sensor
22 Acceleration sensor
23 Yaw rate sensor
24 Wheel speed sensor
100 Control device
101 Distance detector
102 Detected distance limiter
103 Object status determining unit
104 Traveling status calculator
105 Minimum roadside distance determining unit
106 Roadside distance calculator
107 Roadside distance selector
108 Vehicle speed controller
202 Roadside distance

The invention claimed is:

1. A mining vehicle comprising:
a distance detector configured to detect a distance between the vehicle traveling on a transport road of a mining site and an object in front of the vehicle on the transport road and further detect a relative speed of the vehicle to the object;
a minimum roadside distance determining unit configured to store a minimum roadside distance calculated from a shape of the transport road;
a state quantity sensor configured to detect a state quantity of the vehicle;
a traveling status calculator configured to calculate traveling status of the vehicle and a turning radius of the vehicle on a basis of the vehicle's state quantity detected by the state quantity sensor;
a roadside distance calculator configured to calculate, on a basis of the calculated turning radius, a roadside distance between the vehicle and a roadside of the transport road;
a roadside distance selector configured to select and output the minimum roadside distance on a basis of the calculated traveling status of the vehicle if the vehicle is in a rectilinearly traveling state and configured to select and output the roadside distance calculated with the roadside distance calculator on a basis of the calculated traveling status of the vehicle if the vehicle is in a turning state;
a detected distance limiter configured to disable a signal representing the distance, detected with the distance detector, between the vehicle and the object in front of the vehicle and the relative speed if the distance between the vehicle and the object is larger than a distance represented by a signal selected and output from the roadside distance selector, and configured to output a signal representing the distance, detected with the distance detector, between the vehicle and the object in front of the vehicle and the relative speed if the distance between the vehicle and the object is smaller than a distance represented by a signal selected and output from the roadside distance selector; and
a vehicle speed controller configured to control the speed of the vehicle on a basis of signal output from the detected distance limiter.

2. A mining vehicle comprising:
a distance detector configured to detect a distance between the vehicle traveling on a transport road of a mining site and an object in front of the vehicle on the transport road and further detect a relative speed of the vehicle to the object;
a minimum roadside distance determining unit configured to store a minimum roadside distance calculated from a shape of the transport road;
a state quantity sensor configured to detect a state quantity of the vehicle; a traveling status calculator configured to calculate traveling status of the vehicle and a turning radius of the vehicle on a basis of the vehicle's state quantity detected by the state quantity sensor;
a roadside distance calculator configured to calculate, on a basis of the calculated turning radius, a roadside distance between the vehicle and a roadside of the transport road;
a roadside distance selector configured to select and output the minimum roadside distance on a basis of the calculated traveling status of the vehicle if the vehicle is in a rectilinearly traveling state and configured to select and output the roadside distance calculated with the roadside distance calculator on a basis of the calculated traveling status of the vehicle if the vehicle is in a turning state;
an object status determining unit configured to determine whether or not the object in front of the vehicle is a stationary object on a basis of the relative speed, detected by the distance detector, of the vehicle to the object in front of the vehicle and a vehicle's speed detected with the state quantity sensor;
a detected distance limiter configured to disable, on a basis of a result of determination made by the object status determining unit and the traveling status of the vehicle, a signal having a distance between the vehicle and the object larger than a distance represented by a signal selected and output from the roadside distance selector, the signal representing the distance, detected with the distance detector, between the vehicle and the object in front of the vehicle and the relative speed, and configured to output, on a basis of a result of determination made by the object status determining unit and the traveling status of the vehicle, a signal having a distance between the vehicle and the object smaller than a distance represented by a signal selected and output from the roadside distance selector, the signal representing the distance, detected with the distance detector, between the vehicle and the object in front of the vehicle and the relative speed; and
a vehicle speed controller configured to control the speed of the vehicle on a basis of signal output from the detected distance limiter.

3. The mining vehicle according to claim 2,
wherein if the object status determining unit determines that the object in front of the vehicle is the stationary object or the traveling status calculator determines that the traveling status is the turning state, the detected distance limiter disables the signal having the distance between the vehicle and the object larger than the distance represented by the signal selected and output from the roadside distance selector, the signal representing the distance, detected with the distance detector, between the vehicle and the object in front of the vehicle and the relative speed.

4. The mining vehicle according to claim 1,
wherein the minimum roadside distance determining unit stores, as an initial minimum roadside distance, the minimum roadside distance calculated from the shape of the transport road,
wherein the minimum roadside distance determining unit updates the minimum roadside distance so as to set a distance to the stationary object as a new minimum roadside distance when a stationary object in front of the vehicle is detected while the traveling status of the vehicle is the rectilinearly traveling state, and wherein after the update until the traveling status of the vehicle becomes the turning state, the minimum roadside distance determining unit sequentially updates the minimum roadside distance by subtracting a traveling distance, calculated from the speed of the vehicle, of the vehicle from the minimum roadside distance.

5. The mining vehicle according to claim 2, wherein the minimum roadside distance determining unit stores, as an initial minimum roadside distance, the minimum roadside distance calculated from the shape of the transport road, wherein the minimum roadside distance determining unit updates the minimum roadside distance so as to set a distance to the stationary object as a new minimum roadside distance when a stationary object in front of the vehicle is detected while the traveling status of the vehicle is the rectilinearly traveling state, and wherein after the update until the traveling status of the vehicle becomes the turning state, the minimum roadside distance determining unit sequentially updates the minimum roadside distance by subtracting a traveling distance, calculated from the speed of the vehicle, of the vehicle from the minimum roadside distance.

6. The mining vehicle according to claim 3, wherein the minimum roadside distance determining unit stores, as an initial minimum roadside distance, the minimum roadside distance calculated from the shape of the transport road, wherein the minimum roadside distance determining unit updates the minimum roadside distance so as to set a distance to the stationary object as a new minimum roadside distance when a stationary object in front of the vehicle is detected while the traveling status of the vehicle is the rectilinearly traveling state, and wherein after the update until the traveling status of the vehicle becomes the turning state, the minimum roadside distance determining unit sequentially updates the minimum roadside distance by subtracting a traveling distance, calculated from the speed of the vehicle, of the vehicle from the minimum roadside distance.

* * * * *